United States Patent
Takeda et al.

(10) Patent No.: US 9,491,749 B2
(45) Date of Patent: Nov. 8, 2016

(54) RADIO COMMUNICATION METHOD, RADIO COMMUNICATION SYSTEM AND RADIO BASE STATION

(71) Applicant: NTT DOCOMO, INC., Tokyo (JP)

(72) Inventors: Kazuaki Takeda, Tokyo (JP); Satoshi Nagata, Tokyo (JP); Yoshihisa Kishiyama, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/416,155

(22) PCT Filed: Jul. 22, 2013

(86) PCT No.: PCT/JP2013/069803
§ 371 (c)(1),
(2) Date: Jan. 21, 2015

(87) PCT Pub. No.: WO2014/017440
PCT Pub. Date: Jan. 30, 2014

(65) Prior Publication Data
US 2015/0181573 A1    Jun. 25, 2015

(30) Foreign Application Priority Data
Jul. 23, 2012 (JP) ................................. 2012-162819

(51) Int. Cl.
*H04W 4/00* (2009.01)
*H04W 72/04* (2009.01)
(Continued)

(52) U.S. Cl.
CPC ............ *H04W 72/042* (2013.01); *H04J 11/00* (2013.01); *H04L 5/0048* (2013.01); *H04L 5/0053* (2013.01); *H04W 16/28* (2013.01); *H04L 5/0051* (2013.01)

(58) Field of Classification Search
CPC ... H04W 72/042; H04W 16/28; H04J 11/00; H04L 5/0053; H04L 5/0048; H04L 5/0051
See application file for complete search history.

(56) References Cited

U.S. PATENT DOCUMENTS

2015/0036616 A1* 2/2015 Lee ....................... H04L 5/0023
370/329
2015/0063241 A1 3/2015 Shimezawa et al.

FOREIGN PATENT DOCUMENTS

JP         2013192146 A    9/2013

OTHER PUBLICATIONS

Office Action issued in the counterpart Japanese patent application No. JP2012-162819, mailed Mar. 24, 2015, with English translation thereof (5 pages).

(Continued)

*Primary Examiner* — Afshawn Towfighi
(74) *Attorney, Agent, or Firm* — Osha Liang LLP

(57) ABSTRACT

To appropriately allocate radio resources to downlink control information, in the enhanced downlink control channel, a radio communication method in which a radio base station transmits downlink control information to each user terminal via an enhanced downlink control channel frequency division multiplexed with a downlink shared data channel is provided. The method includes generating the downlink control information in eCCE unit, the eCCE being made up with a plurality of eREGs, and mapping the downlink control information in eREG unit to a plurality of resource regions for the enhanced downlink control channel. Each eREG is made up with a plurality of REs, and the radio base station performs mapping to each of the resource regions in such a manner that the enhanced resource element groups (eREGs) are uniform in number of resource elements. The REs that make up 1 eREG are distributed to a plurality of OFDM symbols.

6 Claims, 15 Drawing Sheets

(51) Int. Cl.
*H04L 5/00* (2006.01)
*H04J 11/00* (2006.01)
*H04W 16/28* (2009.01)

(56) References Cited

OTHER PUBLICATIONS

3GPP TSG RAN WG1, R1-121977, "Views on Resource Mapping for ePDCCH", Meeting #69, Prague, Czech Republic, May 21-25, 2012 (5 pages).
International Search Report issued in PCT/JP2013/069803 mailed on Oct. 1, 2013 (1 pages).
Ericsson et al.; "DCI multiplexing by eREG"; 3GPP TSG-RAN WG1 #69, R1-122001; Prague, Czech Republic; May 21-25, 2012 (4 pages).
Ericsson et al.; "Mapping of ePDCCH to RE"; 3GPP TSG-RAN WG1 #69, R1-122000; Prague, Czech Republic; May 21-25, 2012 (4 pages).
3GPP TR 25.913 V8.0.0; "3rd Generation Partnership Project; Technical Specification Group Radio Access Network; Requirements for Evolved UTRA (E-UTRA) and Evolved UTRAN (E-UTRAN) (Release 8)"; Dec. 2008 (18 pages).
Extended Search Report issued in corresponding European Application No. 13823237.6, mailed Feb. 16, 2016 (8 pages).
Huawei et al.; "eCCE definition for ePDCCH"; 3GPP TSG RAN WG1 Meeting #69, R1-121963; Prague, Czech Republic; May 21-25, 2012 (4 pages).
Office Action issued in the counterpart Japanese Patent Application No. 2015-173634, mailed Jul. 5, 2016 (6 pages).
MediaTek Inc.; "Necessesity of Multiplexing fo Localized and Distributed ePDCCH Parts in the Same PRBs"; 3GPP TSG-RAN WG1 #69, R1-122168; Prague, Czech Republic; May 21-25, 2012 (3 pages).
InterDigital et al.; "WF on ePDCCH"; 3GPP TSG RAN WG1 #69, R1-122907; Prague, Czech Republic; May 21-25, 2012 (2 pages).

\* cited by examiner

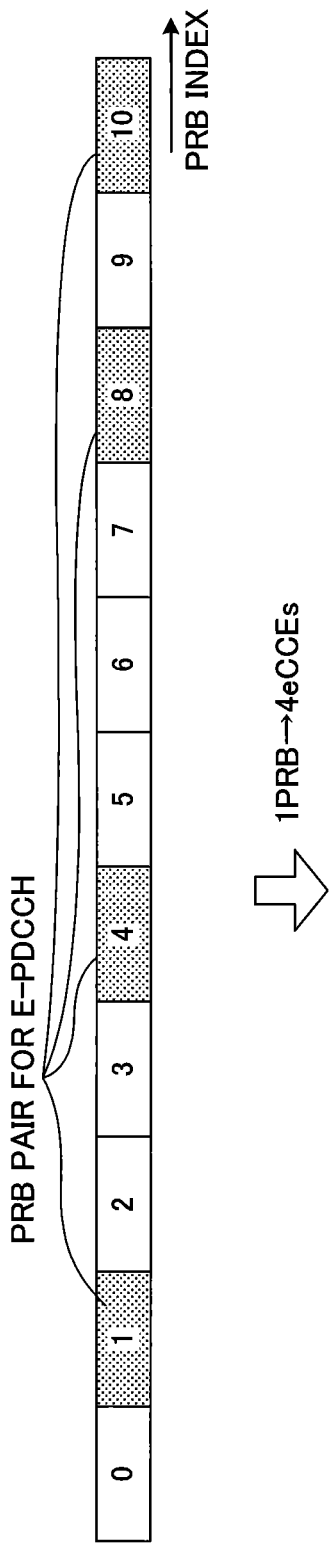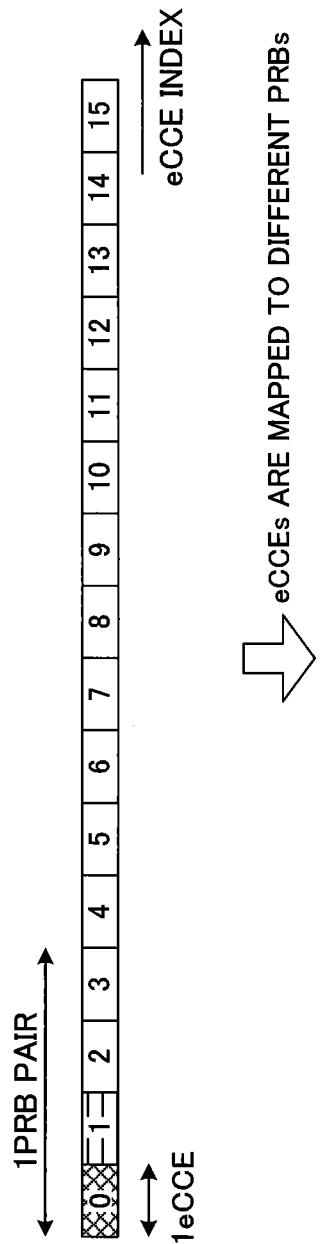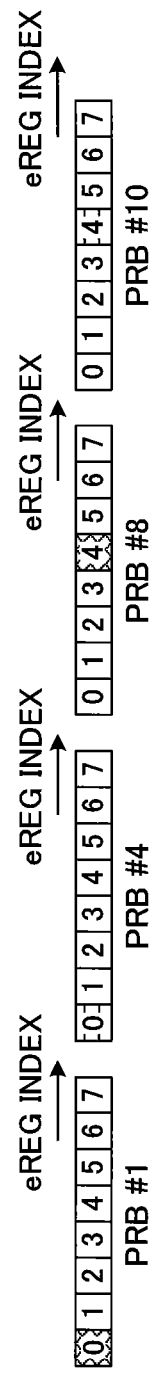

- PRB = 4 (16 eCCE)
- N=16 eREG (1eCCE = 4 eREGs)

- 8 eREG (1eCCE = 2 eREGs)
- 4 PRB PAIR eREG INDEX

| | 0 | 1 | 2 | 3 | 4 | 5 | 6 | 7 |
|---|---|---|---|---|---|---|---|---|
| PRB PAIR #1 | 0 | 4 | 8 | 12 | 2 | 6 | 10 | 14 |
| PRB PAIR #2 | 1 | 5 | 9 | 13 | 3 | 7 | 11 | 15 |
| PRB PAIR #3 | 2 | 6 | 10 | 14 | 0 | 4 | 8 | 12 |
| PRB PAIR #4 | 3 | 7 | 11 | 15 | 1 | 5 | 9 | 13 |

CYCLIC SHIFT

FIG.10A

- 8 eREG (1eCCE = 2 eREGs)
- 8 PRB PAIR eREG INDEX

| | 0 | 1 | 2 | 3 | 4 | 5 | 6 | 7 |
|---|---|---|---|---|---|---|---|---|
| PRB PAIR #1 | 0 | 8 | 16 | 24 | 4 | 12 | 20 | 28 |
| PRB PAIR #2 | 1 | 9 | 17 | 25 | 5 | 13 | 21 | 29 |
| PRB PAIR #3 | 2 | 10 | 18 | 26 | 6 | 14 | 22 | 30 |
| PRB PAIR #4 | 3 | 11 | 19 | 27 | 7 | 15 | 23 | 31 |
| PRB PAIR #5 | 4 | 12 | 20 | 28 | 0 | 8 | 16 | 24 |
| PRB PAIR #6 | 5 | 13 | 21 | 29 | 1 | 9 | 17 | 25 |
| PRB PAIR #7 | 6 | 14 | 22 | 30 | 2 | 10 | 18 | 26 |
| PRB PAIR #8 | 7 | 15 | 23 | 31 | 3 | 11 | 19 | 27 |

CYCLIC SHIFT

FIG.10B

RADIO COMMUNICATION METHOD, RADIO COMMUNICATION SYSTEM AND RADIO BASE STATION

TECHNICAL FIELD

The present invention relates to a radio communication method, a radio communication system and a radio base station in a next-generation mobile communication system.

BACKGROUND ART

In a UMTS (Universal Mobile Telecommunications System) network, for the purposes of further increasing data rates and providing low delay and so on, long-term evolution (LTE) has been under study (see Non-Patent Literature 1). In LTE, as multi access schemes, OFDMA (Orthogonal Frequency Division Multiple Access) is adopted for the downlink and SC-FDMA (Single Carrier Frequency Division Multiple Access) is adopted for the uplink.

In addition, for the purposes of achieving further broadbandization and higher speeds, a successor system to LTE has been under study (which may be called, for example, LTE Advanced or LTE Enhancement (hereinafter referred to as "LTE-A")). In LTE (Rel. 8) and LTE-A (Rel. 9, Rel. 10), MIMO (Multi Input Multi Output) technique has been also considered as a radio communication technique for transmitting and receiving data via a plurality of antennas thereby to improve a spectrum efficiency. In this MIMO technique, a transmission/reception device is equipped with a plurality of transmission/reception antennas, and different transmission information sequences are transmitted simultaneously from the different transmission antennas.

CITATION LIST

Non-Patent Literature

Non-Patent Literature 1: 3GPP TR 25.913 "Requirements for Evolved UTRA and Evolved UTRAN"

SUMMARY OF THE INVENTION

Technical Problem

By the way, in the LTE-A system that is a successor system to LTE, study has been made about multiple user MIMO (MU-MIMO) transmission in which transmission information sequences are simultaneously transmitted from different transmission antennas to different users. This MU-MIMO transmission is applied to Hetnet (Heterogeneous network) and CoMP (Coordinated Multi-Point) transmission.

In future systems, an increase in number of users connected to a radio base station apparatus will be likely to cause shortage in capacity of downlink control channel to transmit downlink control information. Therefore, the conventional method of allocating radio resources may have a problem that it is difficult to make full use of the performance of a future system for MU-MIMO transmission and the like.

In order to solve this problem, there may be provided a method of extending radio resources for downlink control channel to transmit more downlink control information. In such a case, there arises an issue about how to allocate radio resources to downlink control information in the extended (enhanced) downlink control channel, that is, how to map downlink control information to resource regions for the enhanced control channel.

The present invention has been made in view of the foregoing and aims to provide a radio communication method, a radio communication system and a radio base station that are capable of allocating radio resources to downlink control information appropriately in the enhanced downlink control channel.

Solution to Problem

The present invention provides a radio communication method in a radio communication system in which a radio base station transmits downlink control information to each user terminal via an enhanced downlink control channel that is frequency division multiplexed with a downlink shared data channel, the radio communication method comprising the steps of: by the radio base station, generating the downlink control information in units of enhanced control channel elements (eCCEs), each of enhanced control channel elements being made up with a plurality of enhanced resource element groups (eREGs); and mapping the downlink control information in units of enhanced resource element groups (eREGs) to a plurality of resource regions for the enhanced downlink control channel, and wherein each of the enhanced resource element groups (eREGs) is made up with a plurality of resource elements (REs), and the radio base station performs mapping to each of the resource regions in such a manner that the enhanced resource element groups (eREGs) are uniform in number of resource elements (REs) and the resource elements (REs) that make up one enhanced resource element group (1 eREG) are distributed to a plurality of OFDM symbols.

Technical Advantage of the Invention

According to the present invention, it is possible to allocate radio resources appropriately to downlink control information in an enhanced downlink control channel.

BRIEF DESCRIPTION OF THE DRAWINGS

FIG. 5 provides diagrams each illustrating an example of distributed mapping of the enhanced PDCCH;

FIG. 10 provides diagrams each illustrating an example of eCCE allocation to eREGs in a plurality of PRBs;

DESCRIPTION OF EMBODIMENTS

Figure 1:
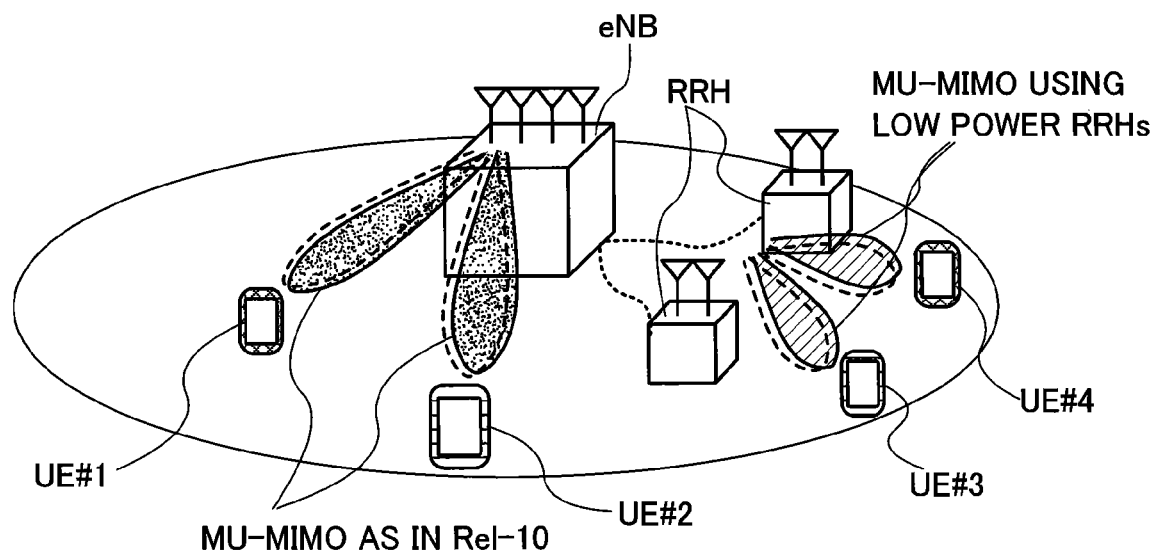
FIG. 1 is a schematic diagram of Hetnet to which MU-MIMO is applied.

FIG. 1 is a diagram illustrating an example of Hetnet to which MU-MIMO transmission is applied. In the system illustrated in FIG. 1, a small-sized base station (e.g., RRH Remote Radio Head) having a local coverage is provided in a coverage of a radio base station (e.g., eNodeB), and the system is configured hierarchically. In this system, downlink MU-MIMO transmission is performed such that data is transmitted from a plurality of antennas of a radio base station to a plurality of user terminals UE #1 and UE #2 (UE: User Equipment) simultaneously. In addition, data is transmitted from a plurality of antennas of a plurality of small-sized base stations to a plurality of user terminals UE #3 and UE #4 simultaneously.

Figure 2:
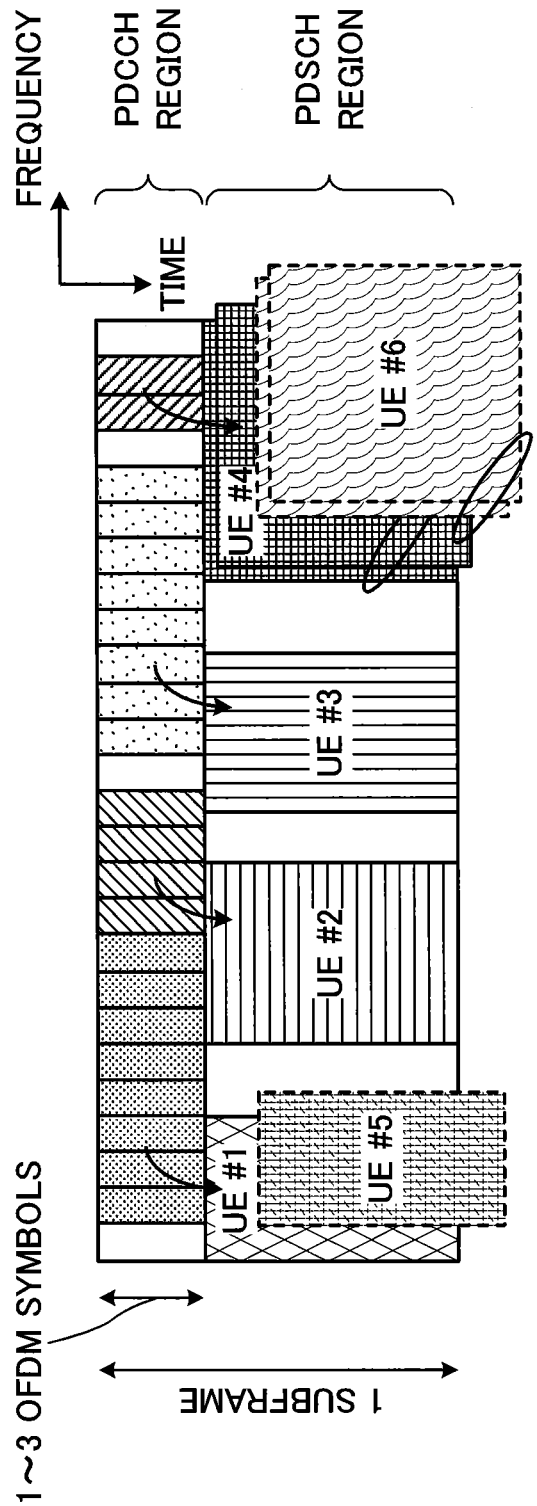
FIG. 2 is a diagram illustrating an example of a subframe in which downlink MU-MIMO transmission is carried out.

FIG. 2 is a diagram illustrating an example of a radio frame (e.g., one subframe) to which downlink MU-MIMO transmission is applied. As illustrated in FIG. 2, in the system under application of MU-MIMO transmission, first to a predetermined-number OFDM symbols (3 OFDM symbols at the maximum) in each subframe are reserved as a radio resource region for downlink control channel (PDCCH: Physical Downlink Control Channel) (PDCCH region). Besides, radio resources following the first to predetermined-number symbols are reserved as a radio resource region for downlink shared data channel (PDSCH: Physical Downlink Shared Channel) (PDSCH region).

The PDCCH region is allocated with downlink control information (DCI) for user terminals UE (UE #1 to UE #4). DCI includes assignment information of data to the user terminals UE in the PDSCH region and the like. For example, in FIG. 2, the user terminal UE #2 receives data for the user terminal UE #2 allocated to the PDSCH region, based on DCI for the user terminal UE #2 allocated to the PDCCH region.

Further, in MU-MIMO transmission, data transmission for a plurality of user terminals is allowed at the same time and in the same frequency. Therefore, in the PDSCH region of FIG. 2, data for the user terminal UE #1 and the data for the user terminal UE #5 may be multiplexed to the same frequency region. Likewise, the data for the user terminal UE #4 and the data for the user terminal UE #6 may be multiplexed to the same frequency region.

However, as illustrated in FIG. 2, if data for the user terminals UE, #1 to UE #6 is allocated in the PDSCH region, it may be difficult to allocate DCI for all the user terminals UE #1 to UE #6 to the PDCCH region. For example, in the PDCCH region of FIG. 2, DCI for the user terminals UE #5 and UE #6 cannot be allocated. In this case, due to insufficiency of the PDCCH region to allocate DCI, the number of user terminals UE to multiplex to the PDSCH region is restricted, and therefore, it may be difficult to enjoy the improvement in the efficiency of use of radio resources by MU-MIMO transmission.

In order to solve this problem of shortage of the PDCCH region, it may be configured that the PDCCH allocation region is extended to a region other than the control region of the first to third OFDM symbols in the subframe (the PDCCH region is extended to the existing PDSCH region of fourth and later OFDM symbols). As a method to extend the PDCCH region, there is a method of time-division-multiplexing PDSCH and PDCCH in the existing PDSCH region (TDM approach) as illustrated in FIG. 3A and a method of frequency-division-multiplexing PDSCH and PDCCH in the existing PDSCH region (FDM approach) as illustrated in FIG. 3B.

Figure 3A:
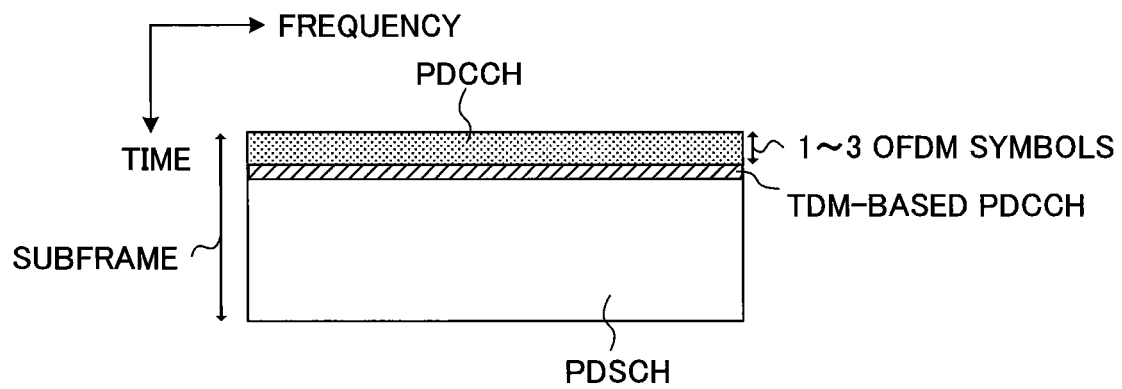
FIG. 3 provides diagrams each for explaining a subframe structure of an enhanced PDCCH.
Figure 3B:
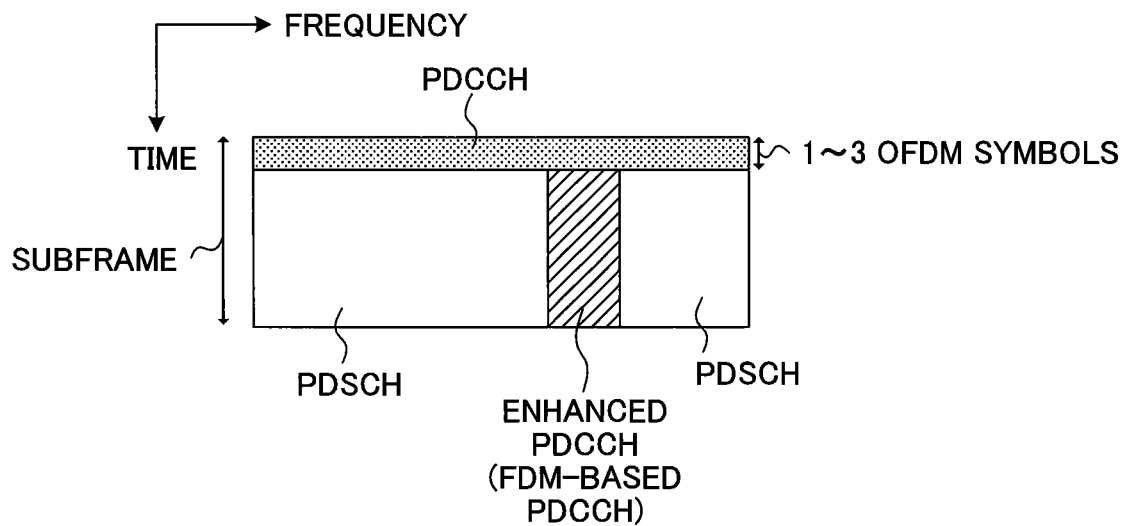

In the TDM approach as illustrated in FIG. 3A, the PDCCH is arranged over the system band in a part of OFDM symbols out of fourth and later OFDM symbols in the subframe. On the other hand, in the FDM approach as illustrated in FIG. 3B, the PDCCH is arranged in a part of the system band over all the fourth and later OFDM symbols in the subframe. The PDCCH frequency-division-multiplexed with the PDSCH in this FDM approach can be demodulated using a demodulation reference signal which is a user-specific reference signal (DM-RS: DeModulation-Reference Signal). Therefore, DCI transmitted by this PDCCH is able to enjoy a beamforming gain like downlink data transmitted in the PDSCH and is also effective at increasing the capacity of the PDCCH. This FDM approach is regarded as becoming important in future.

In the following description, a PDCCH frequency-division-multiplexed with a PDSCH in the FDM approach is called enhanced PDCCH. This enhanced PDCCH may be also called enhanced physical downlink control channel, ePDCCH, E-PDCCH, FDM-based PDCCH, UE-PDCCH or the like.

Figure 4A:
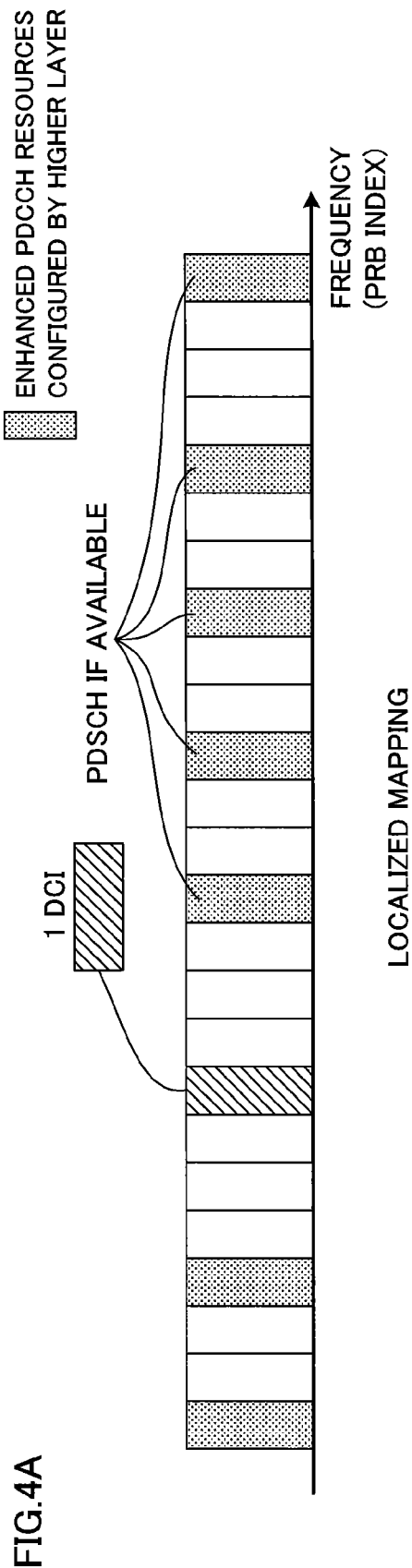
FIG. 4 provides diagrams each for explaining a mapping method of the enhanced PDCCH.

As for the enhanced PDCCH of the FDM approach stated above, the present inventors have studied application of localized mapping and distributed mapping as the DCI mapping method. FIG. 4 provides diagrams each illustrating an example of DCI mapping method in the enhanced PDCCH. FIG. 4A illustrates an example of localized mapping and FIG. 4B illustrates an example of distributed mapping.

As illustrated in 4A and 4B, resources for the enhanced PDCCH are made up of a predetermined number of resource block pairs (PRB (Physical Resource Block) pairs, hereinafter referred to as "PRB pairs") distributed over the system band. Each PRB pair is made up of two consecutive PRBs in the time direction (first slot and latter slot) and is identified by a PRB index assigned in the frequency direction. The plural PRB pairs that make up the enhanced PDCCH resources are determined by higher layers or by the specifications. The PRB index to identify each of the plural PRB pairs is reported to the user terminal UE by higher layer signaling or the like.

As illustrated in FIG. 4A, in the localized mapping, one DCI is locally mapped to a specific PRB pair that constitutes the enhanced PDCCH resources. Specifically, one DCI is mapped to one PRB pair (for example, PRB pair of best channel quality) based on CQI fed back from the user terminal UE. In the localized mapping, use of CQI makes it possible to achieve a frequency scheduling gain. Note that in FIG. 4A, among a plurality of PRB pairs that make up the enhanced PDCCH resources, a PRB pair with no DCI mapping may be mapped with PDSCH.

Figure 4B:
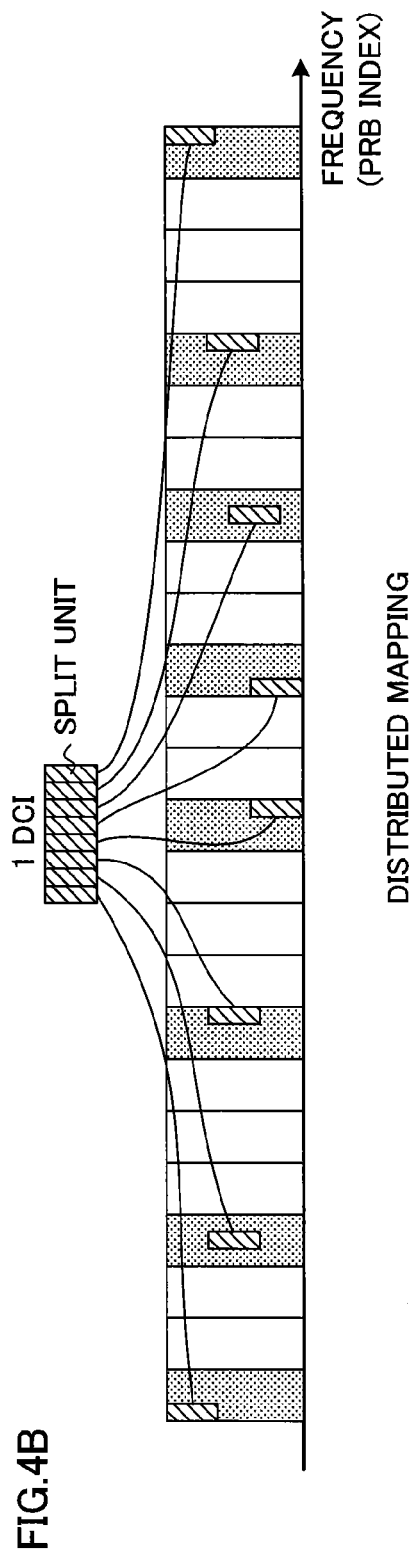

As illustrated in FIG. 4B, in the distributed mapping, one DCI is mapped in a distributed manner to a plurality of PRB pairs that make up the enhanced PDCCH resources. Specifically, one DCI is divided into a plurality of split units, which are mapped in a distributed manner to the above-mentioned PRB pairs (may be mapped to all the PRB pairs). In the distributed mapping, as one DCI is distributed over the system band, it is possible to achieve a frequency diversity gain.

As described above, unlike localized mapping, the distributed mapping is such that each DCI is divided into a plurality of split units, which are mapped in a distributed manner to a plurality of PRB pairs that made up the enhanced PDCCH resources.

In the meantime, downlink control information (DCI) to allocate to the existing PDCCH that extends from first to a predetermined-number OFDM symbols in the subframe is generated in units of control channel elements (CCEs). Each CCE is made up of nine resource element groups (REGs) and each REG is made up of four resource elements (REs).

In order to reuse existing CCEs (for example, for blind decoding or the like), the present inventors have considered generating downlink control information (DCI) to allocate to the enhanced PDCCH also in units of predetermined control channel elements. In the following description, the control channel elements that make up downlink control information to allocate to the enhanced PDCCH are called enhanced channel control elements (eCCE: enhanced Channel Control Element).

In this case, each enhanced control channel element (eCCE) may be made up of a plurality of resource element groups and mapped in a distributed manner to a plurality of PRB pairs for the enhanced PDCCH in units of resource element groups. In the following description, the resource element groups that make up the enhanced control channel element (eCCE) are called enhanced resource element groups (eREG: enhanced Resource Element Group).

FIG. 5 is a diagram illustrating an example of distributed mapping where the enhanced PDCCH is provided. In this case, the system band is made up of eleven physical resource blocks (PRB pairs). The eleven PRB pairs are assigned with PRB indexes (PRB #0 to PRB #10) in the frequency direction. Here, the enhanced PDCCH is made up of four PRB pairs #1, #4, #8 and #10 (see FIG. 5A). In FIG. 5A, the enhanced PDCCH is mapped in PRB unit, but is not limited to this. For example, mapping may be performed in units of resource block groups (RBGs) each made of consecutive PRBs (for example, two or four PRB pairs).

In FIG. 5A, when each PRB pair is made of four eCCEs, the total number of eCCEs is 16. In this case, the eCCEs are assigned with mutually different eCCE indexes #0 to #15 (see FIG. 5B). Then, each eCCE is mapped to a PRB pair, and after that (see FIG. 5C), it is transmitted to the user terminal.

In eCCE mapping, when distributed mapping is applied as illustrated in FIG. 4B above, mapping may be performed in units of split units (eREG) so that the eCCE are distributed to a plurality of PRB pairs (for example, PRB pairs #1, #4, #8 and #10) (see FIG. 5C). In FIG. 5C, eCCE of index number 0 (eCCE #0) is mapped to eREG of index number 0 (eREg #0) of PRB #1 and eREG #4 of PRB #8. That is, two eREGs that make up eCCE #0 are mapped as eREG #0 of PRB #1 and eREG #4 of PRB #8.

However, in this case, it is not decided yet in each PRB pair how to divide into a plurality of eREGs (in which REs to set eREGs of different index numbers) and how to map eCCEs to eREGs in a plurality of PRB pairs.

By the way, study has been made of using a predetermined number of resource elements (REs) to form an eREG as a mapping unit of eCCE to a PRB pair. One PRB pair in normal cyclic prefix (normal CP) and normal subframe, the number of REs available for the enhanced PDCCH is defined to be a predetermined number (for example, 144) and the split number of eREGs (the number of eREGs included in one PRB pair) can be determined based on the predetermined number of REs. When the number of REs available for the enhanced PDCCH is defined to be 144, this number 144 corresponds to a value obtained by deleting the number of REs to arrange DM-RS (24) from the total number of REs in one PRB pair (168).

Figure 6:
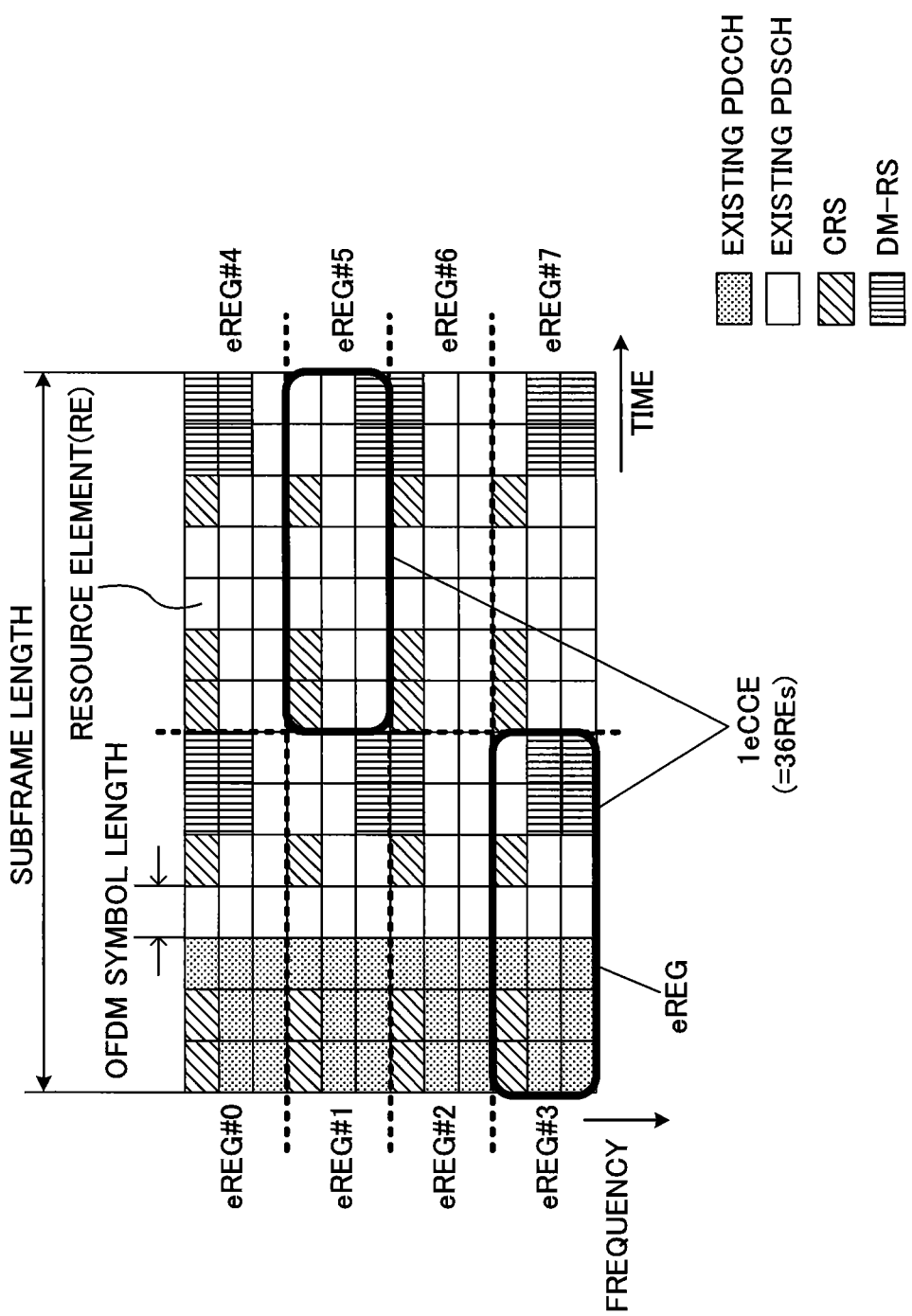
FIG. 6 is a diagram illustrating an example of the method for mapping eCCEs and eREGs to a PRB.

For example, as illustrated in FIG. 6, when one PRB pair is divided into eight eREGs (eREG #0 to eREG #7), there may be considered the method of dividing one PRB pair in a predetermined frequency and time axis direction to provide eREGs. In FIG. 6, when one PRB pair is divided into eight eREGs (eREG #0 to eREG #7), the eREGs are configured of four in the frequency axis direction and two in the time axis direction (first-half slot and last-half slot). In this case, assuming that one PRB is made up of four eCCEs (for example, one eCCE is made up of 36 REs), one eCCE can be made up of two eREGs. That is, in FIG. 6, one eCCE made up of two eREGs is shown as being mapped to a PRB pair in eREG unit.

Thus, when, in one PRB pair, each eREG is arranged in a section defined in the frequency axis direction and in the time axis direction, REs that make up one eREG are arranged concentratedly in a predetermined section. That is, as illustrated in FIG. 6, eREGs assigned with respective index numbers are arranged together in their sections divided in the frequency and time axis direction.

In this case, there may be a case that the number of REs available for the enhanced PDCCH varies (becomes uneven) between eREGs assigned with different index numbers. This is because, as described above, within one PRB pair, REs in a region where DM-RSs are arranged cannot be used for the enhanced PDCCH. For example, in FIG. 6, when, in a PRB pair, REs, other than the REs where DM-RSs are arranged, are used for the enhanced PDCCH, eREG #3 has 17 REs and eREG #5 has 19 REs. Therefore, depending on combination of eREGs, the size may be different (nonuniform) even between eCCEs.

Further, when the eREGs are arranged together in their predetermined sections within a PRB pair, REs constituting one eREG may be arranged in plural on the same OFDM symbol. If there is a restriction on total power in one OFDM symbol, concentration of each eREG at the predetermined section may prevent power uniformity between eREGs, thereby making it difficult to achieve sufficient improvement in the efficiency of power use.

Then, the present inventors have found that by controlling, in a resource region (PRB, RGB and so on) for the enhanced PDCCH, an allocation pattern of a plurality of REs that make up each eREG and/or a mapping method of a plurality of eREGs that make up each eCCE, it becomes possible to allocate downlink control information appropriately to the resource region for the enhanced PDCCH.

Specifically, they have found that in a resource region where the enhanced PDCCH is allocated, a plurality of REs that make up one eREG are distributed to a plurality of OFDM symbols thereby to be able to improve the efficiency of power use. Further, they have also found that at least in the existing LTE system (Rel. 8 to Rel. 10), REs in the region where the control channel (existing PDCCH allocated to first to third OFDM symbols in a subframe) is allocated, REs in the region where reference signals (for example, CRS (Cell specific Reference Signal)) are allocated, and REs in the region where data channel (existing PDSCH) is allocated are provided evenly as REs that make up eREGs of respective index numbers thereby to be able to achieve size uniformity between eREGs.

Further, a plurality of eREGs that make up one eCCE are distributed individually to a plurality of resource regions for the enhanced PDCCH, and downlink control information (DCI) is mapped in such a manner as to make the eREGs that make up one eCCE have different index numbers, thereby achieving a frequency diversity gain and size uniformity between eCCEs. The following description is made in detail about the present embodiment.

(eREG Index Allocation)

With reference to FIG. 7, description is made about the eREG index allocation method to each RE in the resource region where ePDCCH is allocated (allocation pattern control of a plurality of REs that make up each eREG). Note that in FIG. 7, the resource region is described by way of example of one PRB pair in normal cyclic prefix and normal subframe, but this is not intended for limiting the present invention.

Figures 7A, 7B:
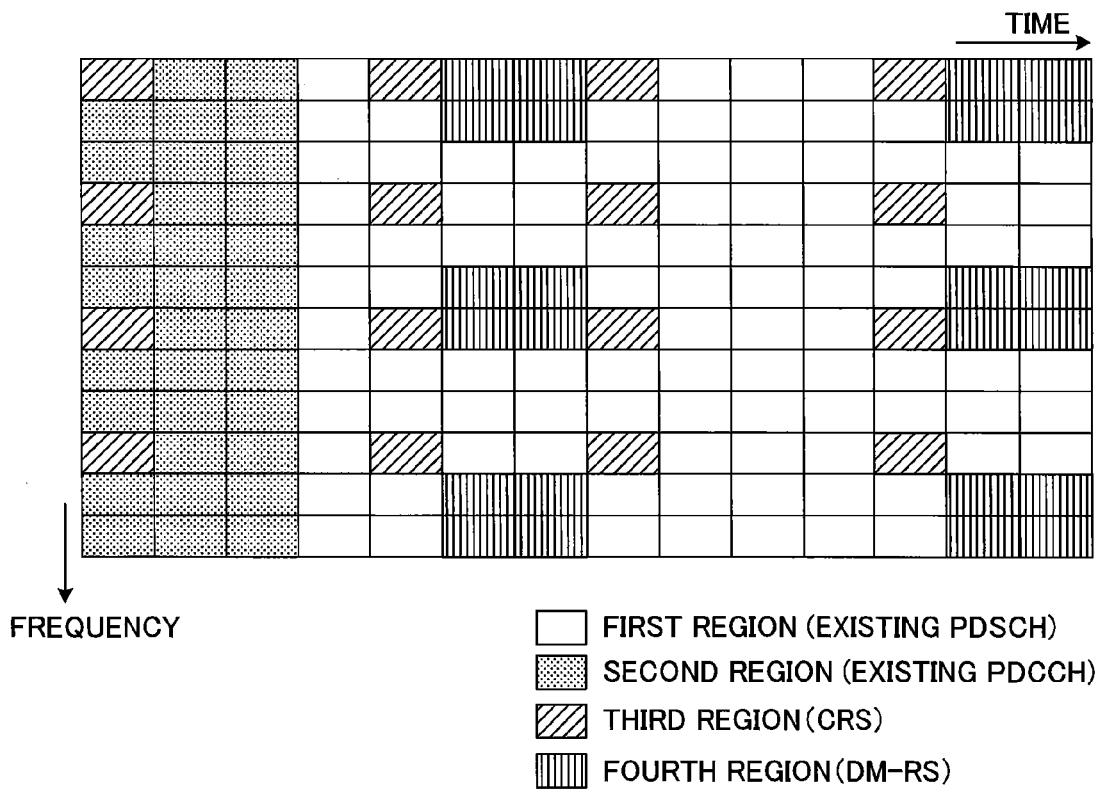
FIG. 7 provides diagrams each illustrating an example of eREG index allocation method.

FIG. 7A illustrates the resource region (one PRB) where ePDCCH is allocated. The resource region illustrated in FIG. 7 consists of first to third regions available for ePDCCH and a fourth region that is not available for ePDCCH and is allocated with DM-RS. The first region, the second region and the third region correspond to regions where PDSCH, existing PDCCH allocated to first to third OFDM symbols in a subframe and reference signals (CRSs) are allocated in an existing LTE system (or another resource region where the ePDCCH is not allocated).

In the resource region where the ePDCCH is allocated, if the reference signals (CRS) are allocated, the first region and the second region are used for the ePDCCH and where the reference signals and existing PDCCH are allocated, the first region is used for the ePDCCH. That is, in the resource region, the first region is most likely to be used for eCCE mapping.

In this embodiment, in such a resource region, mapping is performed in such a manner that the number of REs is uniform between different eREGs and a plurality of REs that make up one eREG are distributed to a plurality of OFDM symbols. Here, making the number of REs uniform between different eREGs is not limited to making the number of REs equal between different eREGs, but may include minimizing difference in the number of REs between eREGs (Preferably, the difference in the number of REs between eREGs is 1 or less).

For example, allocation of eREG index numbers to the REs in the first to third regions is controlled to be even, thereby making it possible to achieve the size uniformity between eREGs. Further, each eREG index number is allocated to REs of different OFDM symbols, thereby making it possible to distribute REs that make up each of REGs to a plurality of OFDM symbols. The following description is made about one example of the allocation method of an eREG index number to each RE.

<Step 1>

First, REs in the regions (first to third regions) available for ePDCCH are numbered sequentially from RE of highest availability for ePDCCH (see FIG. 7B). For example, after REs in the first region are numbered, REs in the regions possibly used for other signals (second region and third region) are subjected to numbering. In FIG. 7B, numbering is first performed on the second region, and then, numbering is performed on the third region. This order may be reversed. Further, numbering is not performed for REs in the fourth region where DM-RSs are allocated.

For example, REs are numbered sequentially in the frequency axis direction (vertical direction in FIG. 7B), starting at a RE in the region of the smallest frequency and time in the first region. Then, cyclic shift may be applied per OFDM symbol as shown in FIG. 7B so that REs that make up each eREG can be distributed as much as possible.

In FIG. 7B, first, REs in the first region are numbered from 0 to 95. Then, REs in the second region are numbered from 96 to 127, from the third OFDM symbol side along the OFDM symbol line. After that, REs in the third region are numbered from 128 to 143.

<Step 2>

Next, indexes allocated to the respective REs in Step 1 are subjected to modulo operation using the number N of eREGs provided in a PRB pair. In this case, the PRB pair is divided into N eREGs.

The number N of eREGs provided in a PRB pair can be selected from, for example, 8, 12, 16, 24 and 36. By selecting any one from these numbers, it is possible to allocate the number of REs (144) available for ePDCCH to each eREG evenly. Particularly, it is preferable that N is 8, 16 or 36.

Figure 8A:
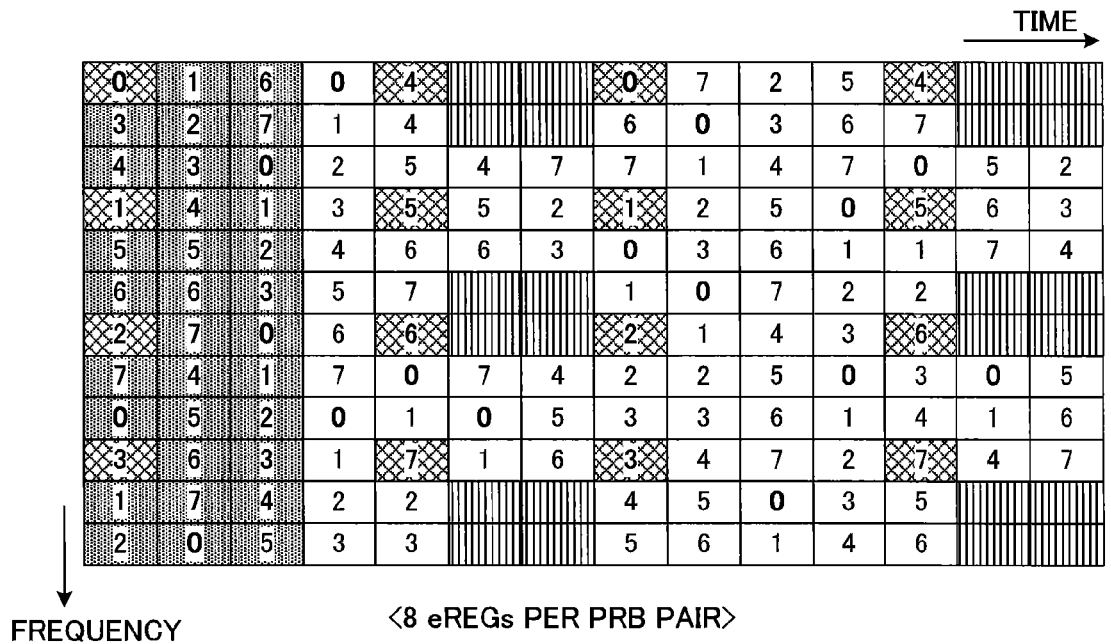
FIG. 8 provides diagrams each illustrating an example of eREG index allocation.
Figure 8B:
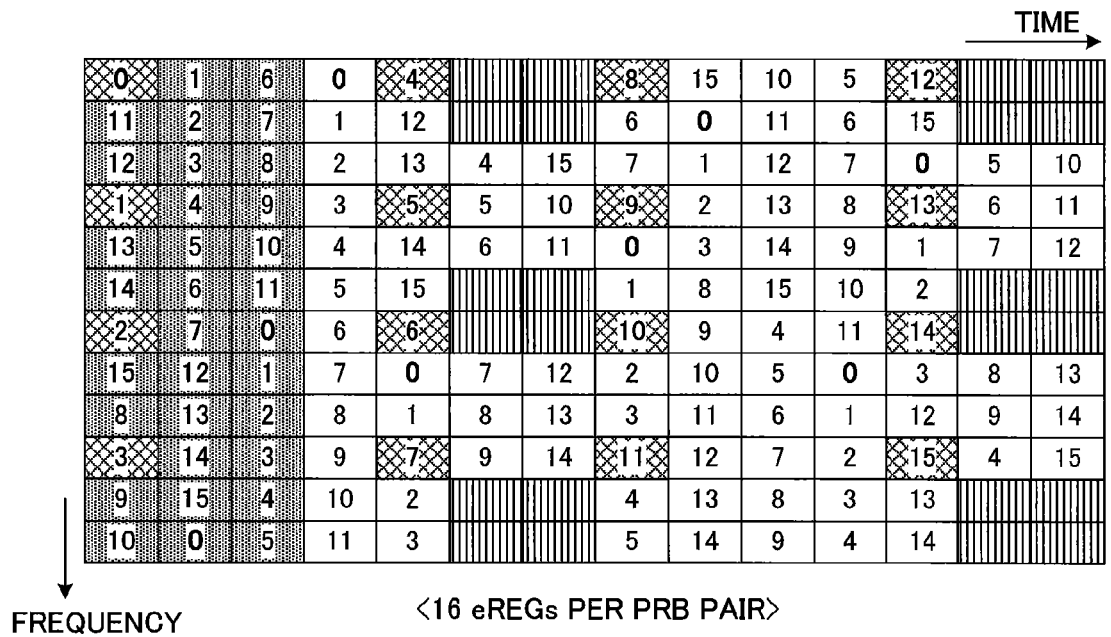

FIG. 8A illustrates application of modulo operation with N=8 and FIG. 8B illustrates application of modulo operation with N=16. In FIG. 8A, REs available for ePDCCH are assigned with indexes 0 to 7 (eREG index numbers). In this case, each of eight eREGs of index numbers 0 to 7 consists of eighteen REs at the maximum. Also, in the case of FIG. 8B, REs available for ePDCCH are assigned with indexes 0 to 15 (eREG index numbers). In this case, each of sixteen eREGs of index numbers 0 to 15 consists of nine REs at the maximum.

Thus, after numbering REs available for ePDCCH sequentially, modulo operation is performed to determine the eREG index number corresponding to each RE, thereby being able to distribute a plurality of REs that make up one eREG to a plurality of OFDM symbols. With this structure, REs of different eREG index numbers are allocated plurally to the same OFDM symbol thereby to be able to achieve power uniformity between OFDM symbols. Then, as compared with eREG allocation as shown in FIG. 6, it is possible to improve the efficiency of power use.

Further, out of the regions available for ePDCCH (first region to third region), REs are numbered sequentially from the REs in the region of highest availability for ePDCCH, thereby being able to allocate REs of different eREG index numbers to the respective regions evenly. With this structure, even when reference signals (CRSs) and/or existing PDCCH are allocated in the resource region for ePDCCH, it is possible to make the size almost uniform over eREGs.

(eCCE Mapping Method in eREG Allocation Unit)

Next description is made about eCCE mapping method to a plurality of resource regions. In this embodiment, a plurality of eREGs that make up one eCCE are distributed to a plurality of resource regions (here, PRB pairs) where enhanced PDCCH is allocated and downlink control information (DCI) is mapped in such a manner that the eREG index numbers distributed are different between the resource regions. With reference to FIG. 9, the following description is made about an example of the method for mapping eCCEs to resource regions available for ePDCCH (here, PRB pairs) in eREG unit. Note that in the following description, it is assumed that REs that make up one eCCE are 36 REs (36 REs/1 eCCE), however the size of eCCE is not limited to this.

As described above, when the total number of REs available for ePDCCH is 144 in one PRB pair, assuming that 1 eCCE=36 REs, one PRB pair can be allocated with four eCCEs at the maximum. In this case, the total number of eCCEs available for downlink control information (DCI) transmitted via the ePDCCH in the system band becomes ePDCCH resource regions×4. For example, as illustrated in FIG. 5A above, when the enhanced PDCCH is set in the four PRB pairs #1, #4, #8 and #10, the number of available eCCEs becomes 16.

In this case, the number of eREGs that make up one eCCE can be obtained "36/(144/N)". That is, it is a value obtained by dividing the number of REs that make up one eCCE "36" by the size of eREG (the number of REs that make up one eREG). As stated above, N is equivalent to the number of eREGs provided in one resource region (for example, one PRB pair).

For example, when eight eREGs are included in one PRB pair (N=8), the number of eREGs that make up one eCCE becomes 2. When sixteen eREGs are included in one PRB pair (N=16), the number of eREGs that make up one eCCE becomes 4.

Figures 9A, 9B:
FIG. 9 provides diagrams each illustrating an example of eCCE allocation method to eREGs in a plurality of PRBs.

FIG. 9A illustrates relationship between each of PRB pairs and a plurality of eREGs (eREG indexes) when the enhanced PDCCH is allocated to four resource regions (here, PRB pairs #1 to #4) and the number of eREGs allocated to one PRB pair is 16. That is, eREG #0 to eREG #15 are mapped to the PRB pairs #1 to #4. As illustrated in FIG. 8B mentioned above, in each of the PRB pairs, REs that forms each of eREG #0 to eREG #15 can be allocated in a distributed manner.

When the number of eCCEs allocated to one PRB pair is 4, the number of eREGs that make up one eCCE becomes 4. In this case, a plurality of eCCEs as illustrated in FIG. 9B (here, sixteen eCCEs #0 to #15) can be mapped to each of the PRB pair #1 to PRB pair #4.

In FIG. 9B, mapping is performed in such a manner that plural eREGs that make up one eCCE are distributed to different PRB pairs and the plural eREGs allocated to the different PRB pairs have different index numbers. That is, a plurality of eREGs that make up one eCCE are assigned with mutually different eREG index numbers and mapped to different PRB pairs.

Thus, as the plural eREGs that make up one eCCE are mapped to different PRB pairs, it is possible to achieve a frequency diversity effect. Besides, as one eCCE is made up of eREGs of different index numbers, it is possible to reduce unevenness of size between eCCEs.

Specifically, eCCE indexes are sequentially mapped to eREG indexes of plural PRB pairs. At this time, mapping is performed in such a manner that eCCEs of consecutive index numbers are allocated to different PRB pairs. For example, as illustrated in FIG. 9B, eCCE #0 to eCCE #3 are allocated to eREG #0 allocated to PRB pairs #1 to #4. Likewise, eCCE #4 to eCCE #7 are allocated to eREG #1 allocated to PRB pairs #1 to #4. The same operation is repeated until one round of allocation of the plural eCCEs is completed. With this process, eCCE #0 to eCCE #15 are allocated to eREG #0 to eREG #3 allocated to PRB pairs #1 to #4.

Next, after one round of allocation of the plural eCCEs is finished, another round of allocation is also performed with application of a cyclic shift. For example, as illustrated in FIG. 9B, eCCE #0 to eCCE #3 are allocated to eREG #4 allocated to PRB pairs #1 to #4. Here, in each eREG index, eCCE allocation starts at PRB pairs #2 and then, follows in the order of PRB pairs #3, #4 and #1 (cyclic shift).

With this structure, a plurality of eREGs that make up one eCCE can be mapped to different PRB pairs. Here, the cyclic shift amount can be determined by "the number of PRB pairs $(N_{PRB})$/the number of eREGs per eCCE $(N_{eREG})$". In this case, the cyclic shift amount is 1(=4/4).

This mapping process is repeated, and then, as illustrated in FIG. 9B, a plurality of eCCEs are mapped to each PRB pair in eREG unit. For example, four eREGs that make up eCCE #0 of the eCCE index number 0 are allocated to PRB pair #1 to PRB pair #4 in a distributed manner. The four eREGs that form eCCE #0 are eREG #0 (PRB pair #1), eREG #4 (PRB pair #2), eREG #8 (PRB pair #3), and eREG #12 (PRB pair #4).

Thus, as the plural eREGs that make up one eCCE are assigned with different eREG index numbers and mapped to different PRB pairs, it is possible to achieve the frequency diversity effect and size uniformity between eCCEs.

Further, the eREGs mapped to each PRB pair can be arranged in a distributed manner to REs of a plurality of OFDM symbols in one PRB. With this arrangement, it is possible to improve the efficiency of power use and to achieve size uniformity between eREGs and eCCEs effectively.

Next, FIG. 10A illustrates an eCCE mapping method adopted where four PRB pairs are provided for enhanced PDCCH and one PRB pair is divided into eight eREGs (N=8) and FIG. 10B illustrates an eCCE mapping method adopted where eight PRB pairs are provided for enhanced PDCCH and one PRB pair is divided into eight eREGs (N=8). Also in FIG. 10, it is assumed that the number of eCCEs per PRB is 4 (for example, 1 eCCE=36 REs).

Also in FIGS. 10A and 10B, as illustrated in FIG. 9, the plural eREGs that make up one eCCE are assigned with different eREG index numbers and mapped to different PRB pairs. In the case illustrated in FIG. 10, the total number of eCCEs (16 in FIG. 10A and 32 in FIG. 10B) becomes greater than the number of eREGs included in one PRB pair. In this case, as illustrated in FIG. 9 mentioned above, eCCEs indexes are sequentially mapped to eREGs indexes of the plural PRB pairs, and thereby, eREGs of eCCEs of consecutive index numbers are finally assigned to different PRB pairs.

For example, eREGs that make up eCCE #0 and eCCE #1 are mapped to different PRB pairs. In this case, in FIG. 10A, two eREGs that make up eCCE #0 are mapped to PRB pair #1 (eREG #0) and PRB pair #3 (eREG #4), and two eREGs that make up eCCE #1 are mapped to PRB pair #2 (eREG #0) and PRB pair #4 (eREG #4). In this way, as eREGs of eCCEs of consecutive index numbers are mapped to different PRB pairs, even when the eCCE binding level (aggregation level) is high, it is possible to achieve the frequency diversity effect.

Here, in this embodiment, it is assumed that each frequency resource unit that makes up an enhanced PDCCH set is a PRB pair. However, this is not intended for limiting the present invention. Each frequency resource unit may be a PRB, or RBG (Resource Block Group) consisting of PRBs that are consecutive in the frequency direction.

Next description is made in detail about a radio communication system according to the present embodiment.

(Radio Communication System Configuration)

Figure 11:
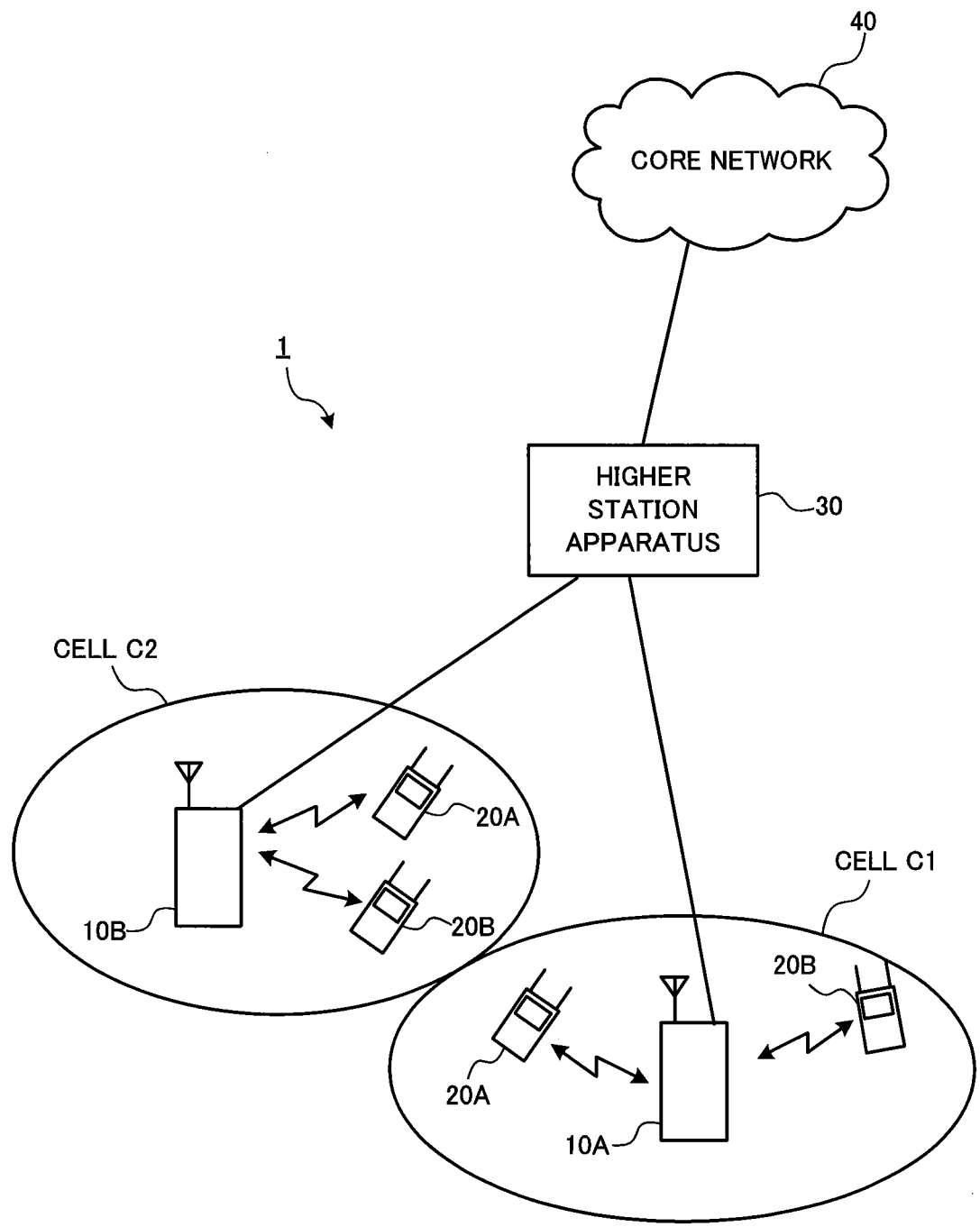
FIG. 11 is a diagram for explaining a system configuration of a radio communication system according to a present embodiment.

FIG. 11 is a diagram for explaining the system configuration of a radio communication system according to the present embodiment. The radio communication system illustrated in FIG. 11 includes the LTE system or succeeding systems to LTE. In this radio communication system, carrier aggregation is adopted such that a plurality of basic frequency blocks are aggregated, each of the basic frequency blocks being a unit of a system band of the LTE system. In addition, this radio communication system may be called IMT-Advanced or 4G.

As illustrated in FIG. 11, the radio communication system 1 is configured to include radio base stations 10 and a plurality of user terminals 20 communicating with the radio base stations 10. The radio base stations 10 are connected to a higher station apparatus 30, which is connected to a core network 40. The radio base stations 10 are connected to each other by wire connection or wireless connection. Each of the user terminals 20 (20A and 20B) are able to communicate with the radio base stations 10 in the cells C1 and C2. Here, the higher station apparatus 30 includes, but is not limited to, for example, an access gateway apparatus, a radio network controller (RNC), a mobility management entity and the like.

Each user terminal 20 includes an LTE terminal and an LTE-A terminal, however, it is described as a user terminal below, unless otherwise specified.

In the radio communication system 1, as radio access schemes, OFDMA (Orthogonal Frequency Division Multiple Access) is applied to the downlink, and SC-FDMA (Single-Carrier Frequency-Division Multiple Access) is applied to the uplink, though the radio access scheme for the uplink is not limited thereto. OFDMA is a multi-carrier transmission scheme to perform communication by dividing a frequency band into a plurality of narrow frequency bands (subcarriers) and mapping data to each subcarrier. SC-FDMA is a single carrier transmission scheme to perform communications by dividing, per terminal, the system band into bands formed with one or continuous resource blocks, and allowing a plurality of terminals to use mutually different bands thereby to reduce interference between terminals.

Here, description is made about communication channels. The downlink communication channel includes a PDSCH (Physical Downlink Shared CHannel), which is a downlink data channel used by each user terminal 10 on a shared basis, a downlink L1/L2 control channel (PDCCH, PCFICH, PHICH), and an enhanced PDCCH that enhances PDCCH. PDSCH is used to transmit higher control information and user data. PDCCH (Physical Downlink Control Channel) is used to transmit scheduling information of PUSCH and PDSCH and the like. PCFICH (Physical Control Format Indicator Channel) is used to transmit OFDM symbol number used in PDCCH. PHICH (Physical Hybrid-ARQ Indicator Channel) is used to transmit ACK/NACK of HARQ of PUSCH.

The enhanced PDCCH is used to transmit PDSCH and PUSCH scheduling information and the like. The enhanced PDCCH is used to compensate for insufficient capacity of the PDCCH using resource regions for the PDSCH.

The uplink communication channels include a PUSCH (Physical Uplink Shared Channel), which is an uplink data channel used by each user terminal on a shared basis, and a PUCCH (Physical Uplink Control Channel), which is an uplink control channel. This PUSCH is used to transmit user data and higher control information. The PUCCH is used to transmit downlink radio quality information (CQI: Channel Quality Indicator), ACK/NACK, and so on.

Figure 12:
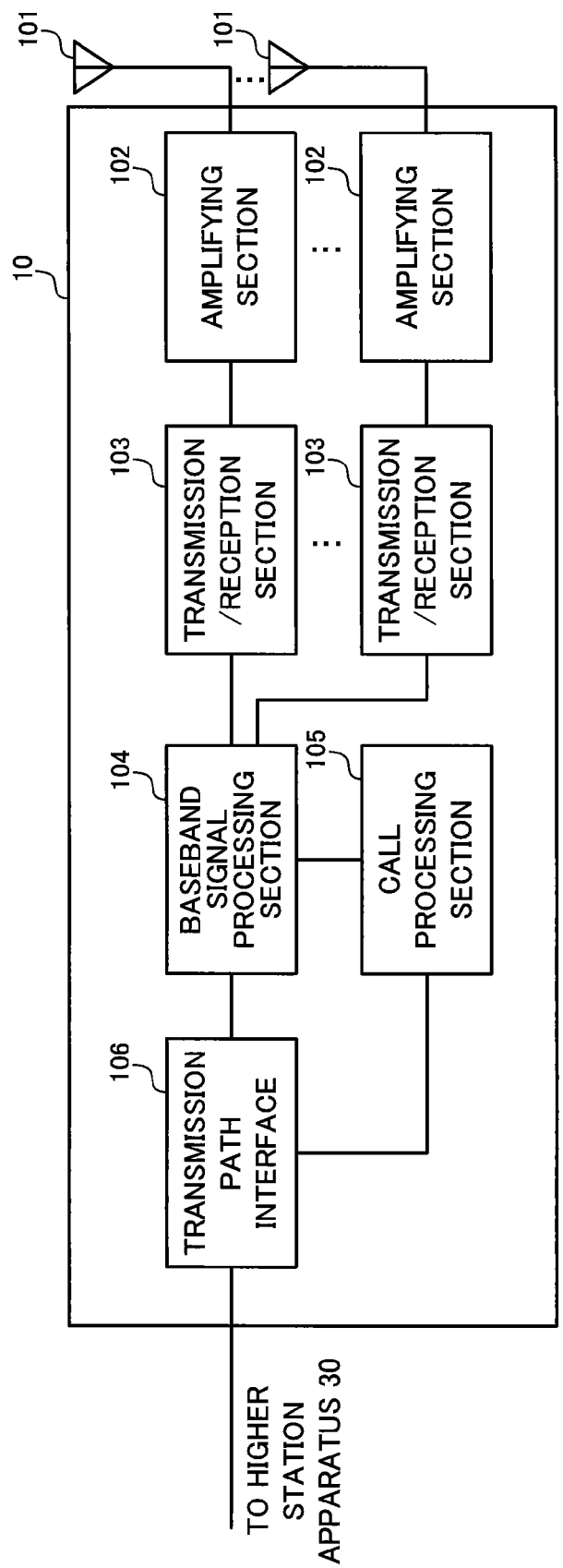
FIG. 12 is a diagram for explaining an overall configuration of a radio base station according to the present embodiment.

FIG. 12 is a diagram of an overall configuration of the radio base station 10 according to the present embodiment. The radio base station 10 has a plurality of transmission/reception antennas 101, amplifying sections 102, transmission/reception sections 103, a baseband signal processing section 104, a call processing section 105 and a transmission path interface 106.

User data that is transmitted on the downlink from the radio base station 10 to the user terminal 20 is input from the higher station apparatus 30, through the transmission path interface 106, into the baseband signal processing section 104.

In the baseband signal processing section 104, signals are subjected to PDCP layer processing, RLC (Radio Link Control) layer transmission processing such as division and coupling of user data and RLC retransmission control transmission processing, MAC (Medium Access Control) retransmission control, including, for example, HARQ transmission processing, scheduling, transport format selection, channel coding, inverse fast Fourier transform (IFFT) processing, and precoding processing. Then, the resultant signals are transferred to each transmission/reception section 103. As for signals of the downlink control channel, transmission processing is performed, including channel coding and inverse fast Fourier transform, and the resultant signals are transmitted to each transmission/reception section 103.

Also, the baseband signal processing section 104 notifies each user terminal 20 of control information for communication in the cell by a broadcast channel. Information for communication in the cell includes, for example, uplink or downlink system bandwidth and so on.

In each transmission/reception section 103, baseband signals which are precoded per antenna and output from the baseband signal processing section 104 are subjected to frequency conversion processing into a radio frequency band. The amplifying section 102 amplifies the radio frequency signals having been subjected to frequency conversion, and the resultant signals are transmitted from the transmission/reception antenna 101.

Meanwhile, as for data to be transmitted on the uplink from the user terminal 20 to the radio base station 10, radio frequency signals are received in each transmission/reception antenna 101, amplified in the amplifying section 102, subjected to frequency conversion and converted into baseband signals in the transmission/reception section 103, and are input to the baseband signal processing section 104.

The baseband signal processing section 104 performs FFT processing, IDFT processing, error correction decoding, MAC retransmission control reception processing, and RLC layer and PDCP layer reception processing on the user data included in the received baseband signals. Then, the resultant signals are transferred to the higher station apparatus 30 through the transmission path interface 106. The call processing section 105 performs call processing such as setting up and releasing a communication channel, manages the state of the radio base station 10 and manages the radio resources.

Figure 13:
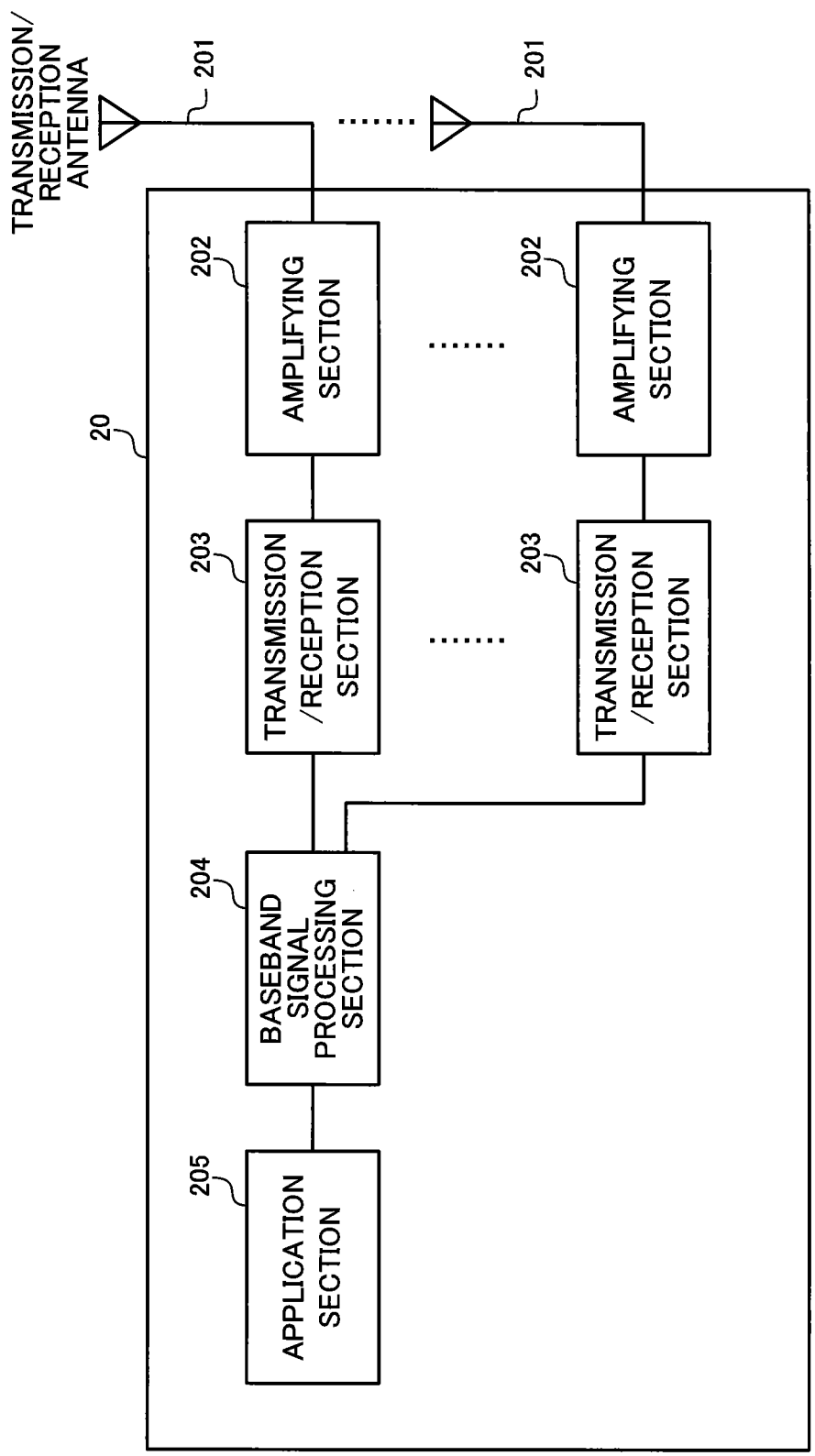
FIG. 13 is a diagram for explaining an overall configuration of a user terminal according to the present embodiment.

FIG. 13 is a diagram of an overall configuration of the user terminal 20 according to the present embodiment. The user terminal 20 has a plurality of transmission/reception antennas 201, amplifying sections 202, transmission/reception sections (reception section) 203, a baseband signal processing section 204 and an application section 205.

As for downlink data, radio frequency signals received in the transmission/reception antennas 201 are amplified in the respective amplifying sections 202, and subjected to frequency conversion into baseband signals in the transmission/reception sections 203. These baseband signals are subjected to reception processing such as FFT processing, error correction decoding and retransmission control and so on, in the baseband signal processing section 204. In this downlink data, downlink user data is transferred to the application section 205. The application section 205 performs processing related to higher layers above the physical layer and the MAC layer. In the downlink data, broadcast information is also transferred to the application section 205.

On the other hand, uplink user data is input from the application section 205 to the baseband signal processing section 204. In the baseband signal processing section 204, retransmission control (H-ARQ: Hybrid ARQ) transmission processing, channel coding, precoding, DFT processing, IFFT processing and so on are performed, and the resultant signals are transferred to each transmission/reception section 203. In the transmission/reception section 203, the baseband signals output from the baseband signal processing section 204 are converted into a radio frequency band. After that, the frequency-converted radio frequency signals are amplified in the amplifying section 202, and then, transmitted from the transmission/reception antenna 201.

Figure 14:
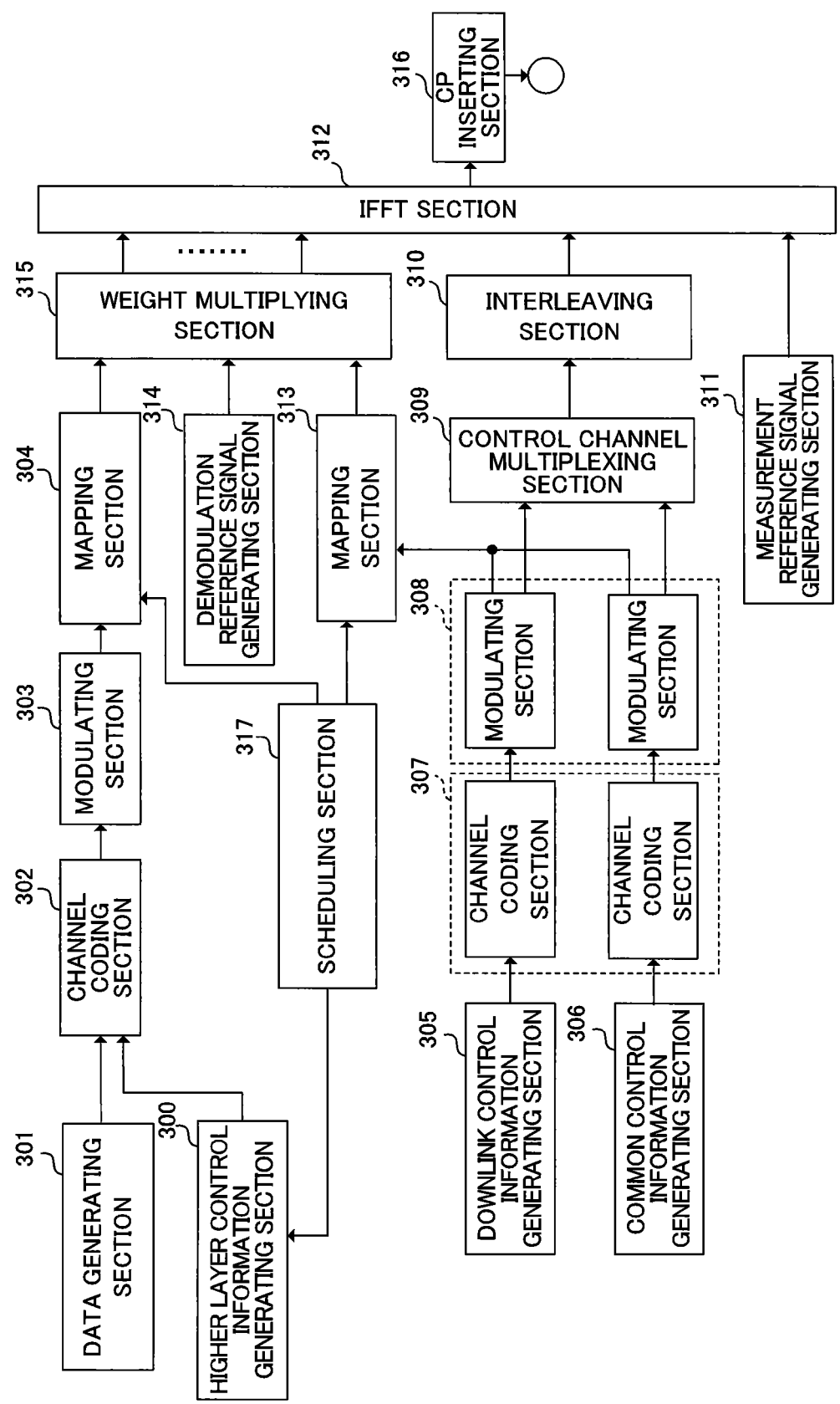
FIG. 14 is a diagram illustrating a functional structure of a baseband signal processing section of the radio base station according to the present embodiment and a part of higher layer.

FIG. 14 is a diagram illustrating a functional structure of the baseband signal processing section 104 of the radio base station 10 according to the present embodiment and a part of the higher layer. The functional structure in FIG. 14 is mainly for downlink (transmission), however the radio base station 10 may also have a functional structure for uplink (reception).

As illustrated in FIG. 14, the radio base station 10 has a higher layer control information generating section 300, a data generating section 301, a channel coding section 302, a modulating section 303, a mapping section 304, a downlink control information generating section 305, a common control information generating section 306, a channel coding section 307, a modulating section 308, a control channel multiplexing section 309, an interleaving section 310, a measurement reference signal generating section 311, an IFFT section 312, a mapping section 313, a demodulation reference signal generating section 314, a weight multiplying section 305, a CP inserting section 316, a scheduling section 317.

The higher layer control information generating section 300 generates higher layer control information for each user terminal 20. The higher layer control information is control information signaled by higher layer (for example, RRC signaling), and includes, for example, allocation information of enhanced PDCCH sets (described later) and the like. The data generating section 301 generates downlink user data for each user terminal 20.

Downlink user data generated in the data generating section 301 and higher layer control information generated in the higher layer control information generating section 300 are input to the channel coding section 302 as downlink data to be transmitted via PDSCH. The channel coding section 302 performs channel coding on downlink data for each user terminal 20 in accordance with a coding rate that is determined based on feedback information from the user terminal 20. The modulating section 303 modulates the channel-coded downlink data in accordance with a modulation scheme that is determined based on the feedback information from the user terminal 20. The mapping section 304 maps the modulated downlink data in accordance with instructions from the scheduling section 317.

The downlink control information generating section 305 generates UE-specific downlink control information (DCI) for each user terminal 20. The UE-specific downlink control information includes PDSCH assignment information (DL assignment), PUSCH assignment information (UL grant) and the like. The common control information generating section 306 generates cell-specific common control information.

The downlink control information generated in the downlink control information generating section 305 and the common control information generated in the common control information generating section 306 are input to the channel coding sections 307 as downlink control information to be transmitted via PDCCH or enhanced PDCCH. The downlink control information to be transmitted via the PDCCH is generated in units of control channel elements (CCEs) and downlink control information to be transmitted via the enhanced PDCCH can be generated in units of enhanced control channel elements (eCCEs). Note that the CCE and eCCE may be different or equal in size (the number of REs) from or to each other.

The channel coding sections 307 perform channel coding on the input downlink control information in accordance with the coding rate instructed from the scheduling section 317. The modulating sections 308 modulates the channel-coded downlink control information in accordance with modulation scheme instructed from the scheduling section 317.

Note that the downlink control information to be transmitted via PDCCH is input from the modulation sections 308 to the control channel multiplexing section 309 and is then multiplexed. The downlink control information multiplexed in the control channel multiplexing section 309 is interleaved in the interleaving section 310. The interleaved downlink control information is input, together with measurement reference signals (CSI-RS: Channel State Information-Reference Signal, CRS: Cell specific Reference Signal etc.) generated in the measurement reference signal generating section 311, to the IFFT section 312.

On the other hand, the downlink control information to be transmitted via the enhanced PDCCH is input from the modulating sections 308 to the mapping section 313. The mapping section 313 maps the downlink control information in predetermined assignment unit (for example, in eREG unit) in accordance with instructions from the scheduling section 317. The mapping section 313 performs distributed mapping of eCCEs allocated with downlink control information to resource regions for the enhanced PDCCH in eREG unit. The mapping section 313 may switch between distributed mapping and localized mapping.

For example, when the distributed mapping is performed, the mapping section 313 distributes a plurality of eREGs that make up one eCCE to a plurality of resource regions for the enhanced PDCCH (PRB pairs or RBGs) in such a manner that the eREG index numbers distributed to the respective resource regions are different from each other. For example, as illustrated in FIG. 9 mentioned above, the plural eREGs that make up one eCCE are assigned with mutually different eREG index numbers and mapped to different PRB pairs, thereby achieving the frequency diversity effect and size uniformity between eCCEs.

Further, as illustrated in FIG. 8, the mapping section 313 may distribute the eREGs mapped to the PRB pairs, to REs of plural OFDM symbols in one PRB. With this structure, it is possible to improve the efficiency of power use and achieving size uniformity between eREGs and eCCEs effectively. Here, the positions where eREGs that make up each eCCE are mapped (resource regions), index numbers of eREGs that make up each eCCE, RE pattern corresponding to each REG in the resource regions and the like may be set based on information from the scheduling section 317 or may be determined in advance in the specification.

The mapped downlink control information is input to the weight multiplying section 315, together with downlink data to be transmitted via the PDSCH (that is, downlink data mapped in the mapping section 314) and the demodulation reference signals (DM-RS) generated in the demodulation reference signal generating section 314. The weight multiplying section 315 multiplies the downlink data to be transmitted via the PDSCH, downlink control information to be transmitted via the enhanced PDCCH and the demodulation reference signals by precoding weights specific to the user terminal 20 and performs precoding thereon.

The precoded transmission data is input to the IFFT section 312, subjected to inverse fast Fourier transform and converted from frequency domain signal to time-series signal. The signal output from the IFFT section 312 is then applied with cyclic prefix (CP) that serves as a guard interval in the CP inserting section 316 and is output to the transmission/reception section 103.

The scheduling section 317 performs scheduling of downlink data to be transmitted on the PDSCH, downlink control information to be transmitted on the enhanced PDCCH and downlink control information to be transmitted on the PDCCH. Specifically, the scheduling section 317 allocates radio resources based on the feedback information from each user terminal 20 (for example, CSI (Channel State Information) including RI (Rank Indicator), CQI (Channel Quality Indicator) and the like) and instruction information from the higher station apparatus 30.

Figure 15:
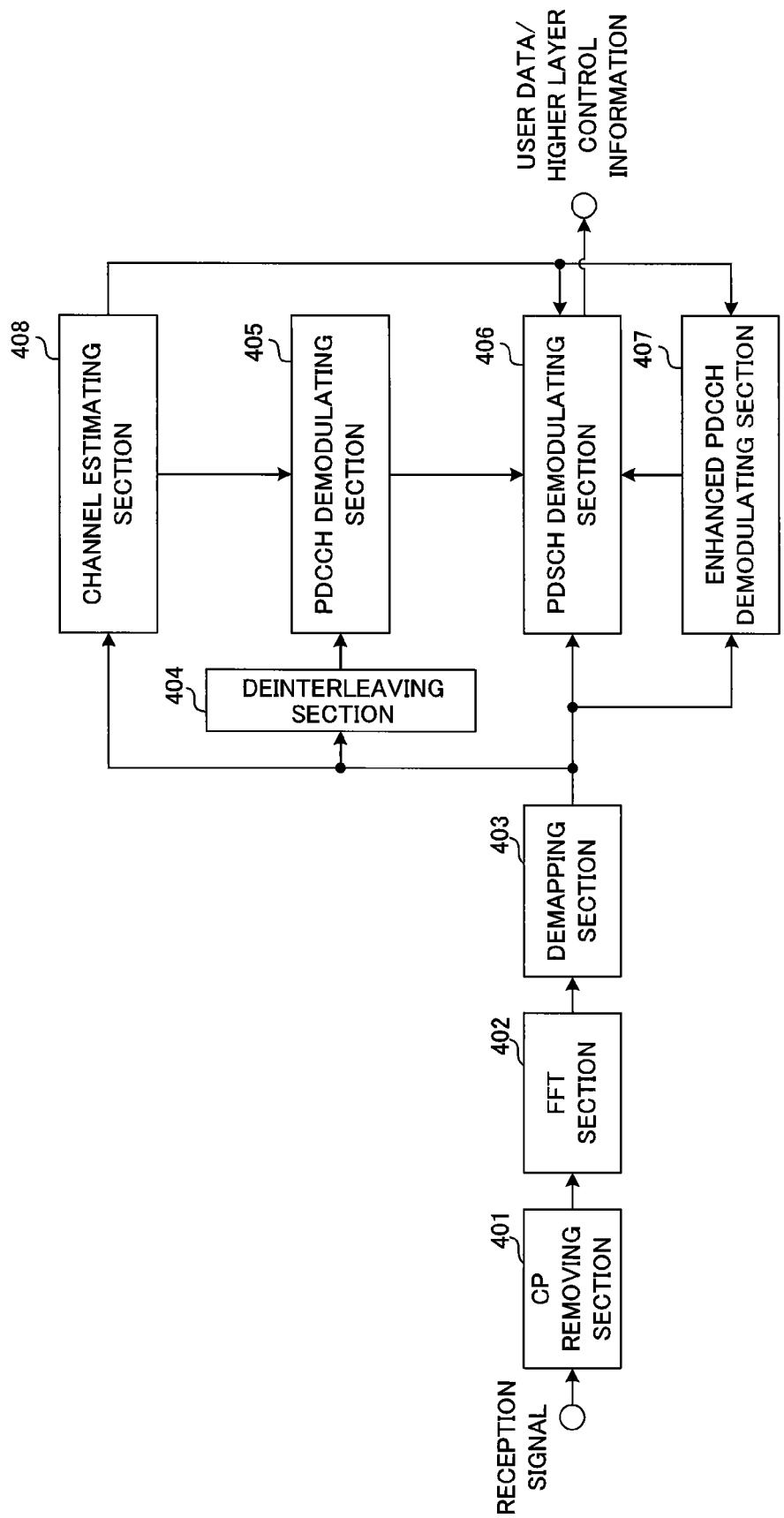
FIG. 15 is a diagram illustrating a functional structure of a baseband signal processing section of the user terminal according to the embodiment.

FIG. 15 is a diagram illustrating a functional structure of the baseband signal processing section 204 of the user terminal 20. In FIG. 15, the functional structure is mainly for downlink (reception), however, the user terminal 20 may have a functional structure for uplink (transmission). The user terminal 20 has, as the functional structure for downlink transmission, a CP removing section 401, an FFT section 402, a demapping section 403, a deinterleaving section 404, a PDCCH demodulating section 405, a PDSCH demodulating section 406, an enhanced PDCCH demodulating section 407 and a channel estimating section 408.

Downlink signals received as reception data from the radio base station 10 are input to the CP removing section 401, where the cyclic prefix (CP) is removed. The CP-removed downlink signals are input to the FFT section 402. The FFT section 402 performs fast Fourier transform (FFT) on the downlink signals and converts them from the time domain signals to the frequency domain signals, and the resultant signals are then input to the demapping section 403. The demapping section 403 demaps the downlink signals. The demapping processing by the demapping section 403 is performed based on the higher layer control information input from the application section 205. The downlink control information output from the demapping section 403 is deinterleaved in the deinterleaving section 404.

The PDCCH demodulating section 405 performs blind decoding, demodulating, channel decoding and the like on the downlink control information (DCI) output from the deinterleaving section 404, based on a channel estimation result by the channel estimating section 408. Specifically, the PDCCH demodulating section 405 performs blind decoding on search space candidates reported in advance from the radio base station 10 or predetermined search space candidates to acquire downlink control information.

The PDSCH demodulating section 406 performs demodulation, channel decoding and the like of downlink data output from the demapping section 403, based on the channel estimation result by the channel estimating section 408. Specifically, the PDSCH demodulating section 406 demodulates PDSCH assigned to the user terminal based on the downlink control information demodulated in the PDCCH demodulating section 405 or the enhanced PDCCH demodulating section 407 (for example, downlink scheduling information such as DL grant) to acquire downlink data directed to the user terminal (downlink user data and higher layer control information).

The enhanced PDCCH demodulating section 407 performs blind decoding, demodulating, channel decoding and the like on the enhanced PDCCH output from the demapping section 403, based on the channel estimation result by the channel estimating section 408.

The channel estimating section 408 performs channel estimation (channel measurement) using demodulation reference signals (DM-RS), measurement reference signals (CRS, CSI-RS) and the like. The channel estimating section 408 outputs channel estimation result based on the measurement reference signal (CRS, CSI-RS) to the PDCCH demodulating section 405. On the other hand, the channel estimating section 408 outputs the channel estimation result based on the demodulation reference signal (DM-RS) to the PDSCH demodulating section 406 and the enhanced PDCCH demodulating section 407. Due to demodulation using the demodulation reference signal (DM-RS) specific to the user terminal 20, it is possible to enjoy beamforming gains for the PDSCH and enhanced PDCCH.

Thus, according to the radio communication system 1 of the present embodiment, the radio base station 10 generates downlink control information in units of enhanced control channel elements (eCCEs) and maps the downlink control information in eREG unit to plurality of resource regions arranged for the enhanced downlink control channel. In this case, the radio base station 10 performs mapping in such a manner that a plurality of eREGs that make up one eCCE are distributed to the plural resource regions and the eREG index numbers distributed to the resource regions are different from each other. Further, the radio base station 10 arranges eREGs mapped to each PRB pair, in such a manner as to distribute the eREGs to REs of a plurality f OFDM symbols in one PRB. With this structure, it is possible to achieve the frequency diversity effect, improve the efficiency of power use, and achieve size uniformity between eREGs and between eCCEs effectively.

Up to this point, the present invention has been described in detail by way of the above-described embodiments. However, a person of ordinary skill in the art would understand that the present invention is not limited to the embodiments described in this description. The present invention could be embodied in various modified or altered forms without departing from the gist or scope of the present invention defined by the claims. Therefore, the statement in this description has been made for the illustrative purpose only and not to impose any restriction to the present invention.

The disclosure of Japanese Patent Application No. 2012-162819, filed on Jul. 23, 2012, including the specification, drawings, and abstract, is incorporated herein by reference in its entirety.

The invention claimed is:

1. A radio base station comprising:
a transmitter that transmits downlink control information in an enhanced downlink control channel that is frequency-division-multiplexed with a downlink shared channel; and
a processor that maps the downlink control information to a plurality of resource elements (REs) that constitute physical resource block (PRB) pairs configured for the enhanced downlink control channel, wherein the downlink control information is generated in units of enhanced control channel elements (eCCEs), each eCCE consisting of multiple enhanced resource element groups (eREGs), and the processor numbers the REs that constitute the PRB pairs, except REs carrying demodulation reference signals (DM-RSs), with numbers corresponding to index numbers of eREGs in frequency and time directions, and maps each eREG to REs corresponding to an index number of the eREG.

2. The radio base station according to claim 1, wherein the processor numbers, in the PRB pairs, REs in a first region for the downlink shared channel (PDSCH), REs in a second region for a downlink control channel (PDCCH) and REs in a third region for cell-specific reference signals (CRSs) of an existing system with the numbers corresponding to the index numbers of eREGs.

3. The radio base station according to claim 2, wherein there are 16 eREGs per PRB pair.

4. The radio base station according to claim 1, wherein there are 16 eREGs per PRB pair.

5. A radio communication method for a radio base station that communicates with a user terminal using an enhanced downlink control channel that is frequency-division-multiplexed with a downlink shared channel, the radio communication method comprising the steps of:

transmitting downlink control information in the enhanced downlink control channel frequency-division-multiplexed with the downlink shared channel; and mapping the downlink control information to a plurality of resource elements (REs) that constitute physical resource block (PRB) pairs configured for the enhanced downlink control channel, wherein the downlink control information is generated in units of enhanced control channel elements (eCCEs), each eCCE consisting of multiple enhanced resource element groups (eREGs), and the REs that constitute the PRB pairs, except REs carrying demodulation reference signals (DM-RSs), are numbered with numbers corresponding to index numbers of eREGs in frequency and time directions, and each eREG is mapped to REs corresponding to an index number of the eREG.

6. A radio communication system including a radio base station and a user terminal that communicates using an enhanced downlink control channel that is frequency-division-multiplexed with a downlink shared channel, the user terminal comprising:

a receiver that receives downlink control information that is transmitted using the enhanced downlink control channel, and the radio base station comprising:

a transmitter that transmits the downlink control information in the enhanced downlink control channel that is frequency-division-multiplexed with the downlink shared channel; and a processor that maps the downlink control information to a plurality of resource elements (REs) that constitute physical resource block (PRB) pairs configured for the enhanced downlink control channel, wherein the downlink control information is generated in units of enhanced control channel elements (eCCEs), each eCCE consisting of multiple enhanced resource element groups (eREGs), and the processor numbers the REs that constitute the PRB pairs, except REs carrying demodulation reference signals (DM-RSs), with numbers corresponding to index numbers of eREGs in frequency and time directions, and maps each ReEG to REs corresponding to an index number of the eREG.

* * * * *